June 16, 1936.   V. F. ZAHODIAKIN   2,044,274
PISTON RING
Filed June 1, 1934

INVENTOR
Victor F. Zahodiakin
BY
Wood & Wood
ATTORNEYS

Patented June 16, 1936

2,044,274

UNITED STATES PATENT OFFICE 2,044,274

PISTON RING

Victor F. Zahodiakin, Cincinnati, Ohio, assignor to The Z-Flex Piston Ring Corporation, a corporation of New Jersey Application June 1, 1934, Serial No. 728,569

7 Claims. (Cl. 309—24)

This invention relates to improvements in piston rings of the character adapted for use in internal combustion engines and the like, and is particularly directed to improvements in the type of ring disclosed and claimed in my issued Patent No. 1,957,927 dated May 8, 1934.

The ring as disclosed in said patent is formed of flexible sheet or spring plate material. Fundamentally the strip of material forming the ring is corrugated to provide for oil flow passageways through the ring and reduction of explosive pressure against the internal periphery of the ring when used as a compression ring, and to provide for the proper edge contact with the cylinder wall. The ring thus formed is quite flexible, both circumferentially and radially. That is to say, it conforms readily and accurately to local and general variations in the wall of the cylinder. The advantages of this type of ring are fully set forth in the mentioned patent.

It is an object of the present invention to provide an improved ring which has the same underlying and fundamental advantages of the ring of the first patent, such as great flexibility, durability, light weight, better oil control, and proof against carbon, whereby it is highly effective for preventing leakage of oil into the combustion chamber or loss of compression.

Specifically, it is a further object of this invention to provide a fabricated ring, in which ring sections or cells are circumferentially arranged and abutted, and subsequently joined to form an integral one-piece ring structure or a structure which is cellular, specifically including transverse or radially disposed cells forming oil passageways. It is a further purpose to provide a fabricated ring as herein disclosed which is extremely easy to manufacture.

In the ring of the aforesaid patent the corrugations as formed and prior to insertion of the ring in the cylinder are open alternately at the top and bottom of the ring. When the ring is pressed into position in the piston groove and within the cylinder wall, the transverse walls of the ring, or walls of the corrugation, are in substantial abutment or minutely spaced, and form the cross cells or tubes above mentioned having slight gaps.

It is a further object of this invention to provide that the oil passages or tubes in the ring do not have gaps or slits in their sides, therefore preventing escape of oil from the cells as would occur when a vacuum is formed above the ring during reciprocation of the piston.

It is a further object to provide a ring of this cellular character in which the cells may be of any circumferential dimension desired as may be necessary for the proper oil flow and oil control as well as for the proper area of edge contact with the cylinder wall.

It is a further object to provide that the cells of the ring are independently flexible, whereby the free flexing of the walls thereof breaks up carbon deposits.

It is a further object to provide that the ring sections making up the fabricated ring combine to provide circumferentially arranged cells having relatively sharp external cross edges which abut to form perfectly flush unbroken flat top and bottom surfaces for the ring.

Other objects and further advantages will be more fully apparent from a description of the accompanying drawing, in which.

The rings disclosed in this application, as heretofore stated, are fabricated structures. Described in general, all forms are constructed of circumferentially arranged abutted ring sections or cells joined together by welding or other means. In each form disclosed the finished integral article provides cells opening at the inner and outer peripheries of the ring.

Figure 1:
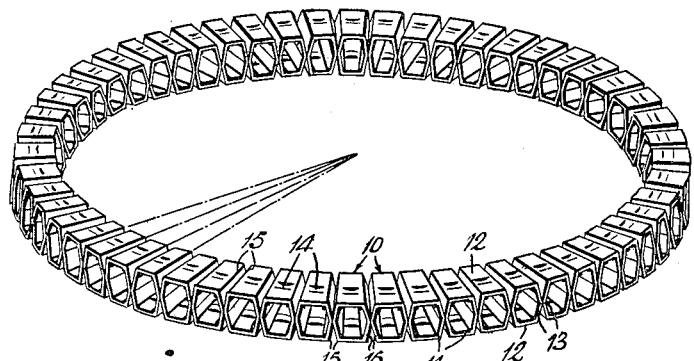
Figure 1 is a perspective view of the assembled fabricated piston ring, showing it apart from the piston and in its expanded position as supplied to the trade.
Figure 2:
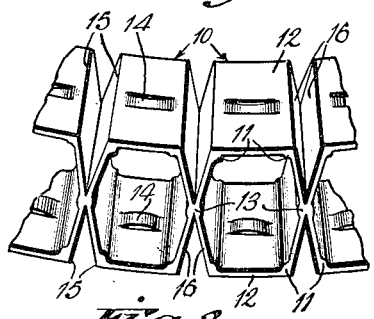
Figure 2 is a fragmentary enlarged perspective view of a portion of the ring of Figure 1, showing the details thereof.
Figure 3:
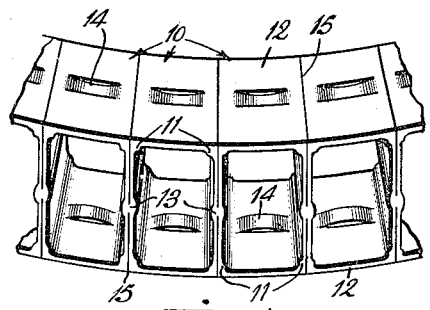
Figure 3 is a fragmentary enlarged perspective view of a portion of the ring, showing it in its compressed position as it appears when mounted in the piston and cylinder.

Describing the form shown in Figures 1 to 3 inclusive, a multiplicity of short sections of tubing 10 are used to form the ring. These tubes as initially assembled and prior to compression of the ring into its position of use are hexagonal in cross section. The tubes are reinforced by the provision of fillets 11 internally disposed along each corner thereof.

As assembled, parallel opposite walls 12 of the tubes form portions of the top and bottom walls of the ring. Opposite external cross corners 13 of each tube in a horizontal plane, or in a plane parallel to the top and bottom walls, abut the corresponding edges of the adjacent tubes at each side thereof. (See Figure 1.) The top and bottom walls of each tube are provided with cross grooves 14 pressed into the wall transverse to the axes of the tube for the purpose of reinforcement.

These ring sections or tubes as stated are placed in side abutment and are thus circumferentially arranged to form the ring. Therefore, the tubes are of tapered form generally so that all side edges or corners, namely, the abutting edges 13 and the side edges 15 of the top and bottom walls, lie on radial lines of the finished ring. With all sections in positive abutment, the assembly operation is completed by welding, whereby the metal in the walls of the adjacent cells at the abutting cross edges merges together or fuses to form an integral one-piece construction.

Thus, these hexagonal tubes join to form a ring which is dilatable since the inclined side walls 16 provide for clearance between the tubes at the upper and lower side edge 15, and the walls are flexible for permitting movement of the sections toward and from each other. The ring is shown in fully compressed position in Figure 3. The tubes or cells as compressed are not hexagonal but assume rectangular shape. The top and bottom walls of the ring, respective top and bottom walls 12 of the tubes, in position of use, are continuous, that is to say, the side walls of the cells which in the expanded ring are inclined with respect to the adjacent cells come together and are in substantially flat abutment.

Therefore, each of the tubes 10 constitutes an independent passageway for the oil from the wall of the cylinder to the inside of the piston ring where the oil returns from the piston ring groove through the conventional apertures in the interior of the piston (not shown).

Figure 5:
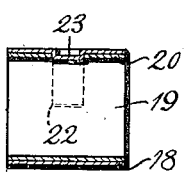
Figure 5 is a sectional view taken on line 5—5, Figure 4.
Figure 4:
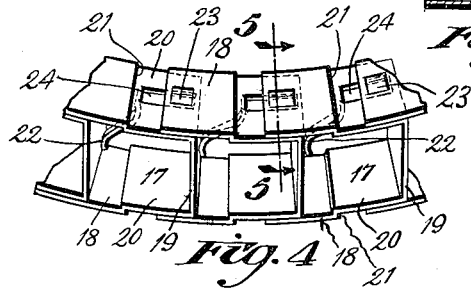
Figure 4 is a fragmentary enlarged perspective view of a portion of a modified ring, showing it in its expanded position as supplied to the trade.
Figure 6:
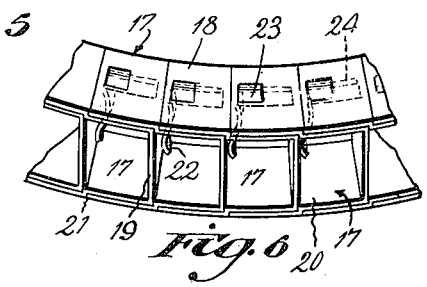
Figure 6 is a fragmentary enlarged perspective view of the ring of Figure 4, showing it in its compressed position as applied in the piston and cylinder.

In the modification shown in Figures 4, 5, and 6, the ring is formed of open sections 17. Each section is of U-form, the arms 18 of the section lying in planes at right angles to the axis of the ring. These ring sections are telescopically engaged in a circumferential arrangement (see Figure 4). Accordingly, it may be said that each radially disposed oil flow passageway in this ring is formed of the base wall 19 and arms 18 of one section 17 and the base wall 19 of the adjacent section.

The sections are slidable telescopically for dilation of the ring. The arms 18 of the sections constituting portions of the top and bottom walls of the piston ring have off-set portions 20, whereby the distance between the arms toward the base wall end of the sections is reduced to receive the arms of the adjacent section. This arrangement provides definite shoulders constituting externally disposed abutments 21 for limiting movement of the sections in compressive movement of the ring.

A tongue 22 is struck inwardly from the top arm of each section out of the off-set portion 20. This tongue is bent forwardly toward the open end of the section and lies against the base wall of the adjacent section. The sections, as stated, are formed of spring metal so that the tongues are under inherent spring tension in their positions of assembly. Therefore, they normally act to keep the sections spread apart in fully dilated position of the ring. A rib 23 is formed in an arm of each section adjacent the elongated opening 24 from which the tongue 22 is formed. This rib extends into the opening and has a sliding fit therein circumferentially of the general ring structure. These ribs prevent disassembly of the sections by limiting expansive movement of the ring. The sections are readily assembled by slightly spreading the arms of each and sliding the section into the adjacent section, the rib snapping into place in the elongated opening 24.

When the ring is compressed the sections slide on each other and the gaps between the ends of the arms and the adjacent shoulders are closed up as shown in Figure 6. With the ring fully compressed the fingers are exerting an expansive force tending to hold the ring snugly against the cylinder wall as in position of use. The end portions of the arms form a substantially continuous plain surface at the top and bottom of the ring. The overlapped arrangement of the arms provides double thickness of metal for the top and bottom of the ring for greater strength.

Figure 7:
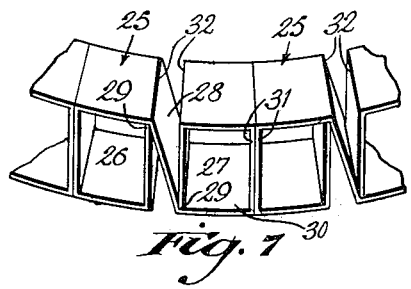
Figure 7 is a fragmentary enlarged perspective view of a portion of a further modified ring, showing it in its expanded unmounted position.
Figure 8:
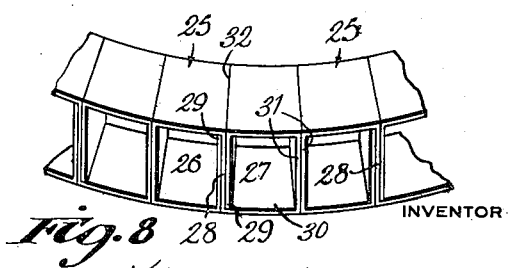
Figure 8 is a fragmentary enlarged perspective view of the ring of Figure 7, showing it in its compressed position as it appears when mounted in the piston and cylinder.

In Figures 7 and 8 the sections 25 of the ring in each instance make up two passageways. These sections are formed of a straight flat strip of spring metal bent to form two rectangular tubes 26, 27, the metal being extended continuously from one to the other of the tubes. The metal is overlapped over the initially formed wall of the first formed tube 26 and is extended at a slight inclination as at 28 to the plane of the bottom wall of the initially formed tube.

From this point, the second tube 27 is formed, the end edge 29 of the strip lying in the corner formed by the inclined connecting portion 28 and the horizontal bottom wall 30 of the second tube. The end edges 29, 29, of the strip are welded into the corners in which they engage. Regarded in top plan view, each section is arcuate and all of the sections are circumferentially arranged and abutted to make up the complete ring structure.

The end faces 31, 31, of the sections which are in abutment are welded together. The spring action in the ring making it dilatable is afforded by the inclined connecting portions 28 between the tubes of each ring. When the ring is compressed into position of use, these inclined connecting portions yield and assume positions parallel with the side walls of the sections as shown in Figure 7. The cross edges 32 of the respective cells of each section abut or substantially abut and continuous or substantially continuous top and bottom walls result when the ring is in use. It will be understood that all the cross edges are made relatively sharp so that the top and bottom walls will be without undulation.

Having described my invention I claim:

1. A piston ring formed of thin flexible sheet material, said ring fabricated of independent tubes circumferentially abutted and secured together, and radially disposed to provide passageways opening at the inner and outer peripheries of said ring.

2. A piston ring formed of sheet material, said ring fabricated of sections secured together, each of said sections including a pair of tubes connected by a flexible wall, the tubes of said sections providing radial passageways open to the inner and outer peripheries of said ring.

3. A piston ring formed of flexible sheet material fabricated of independent hexagonal tubes circumferentially abutted and secured together, and radially disposed to form passageways open at the inner and outer peripheries of said ring, said tubes in side abutment at the longitudinal side edges thereof.

4. A piston ring formed of sheet material, said ring, comprising a plurality of tubes joined together providing radial passageways open to the inner and outer peripheries of said ring.

5. A piston ring fabricated of sheet material, comprising, a plurality of tubes joined together providing radial passageways open to the inner and outer peripheries of said ring, each of said tubes having reinforcing ribs in its upper and lower walls.

6. A piston ring, comprising, a plurality of hexagonal tubular sections, opposite parallel walls of which form portions of the top and bottom walls of the ring, said tubes circumferentially arranged to provide radial passageways for the ring, the longitudinal side edges of each tube abutting and connected to the side edges of the adjacent tubes, whereby the inclined walls extending from these edges to the top and bottom walls are free to flex to provide for dilation of the ring.

7. A piston ring, comprising, a plurality of tubes formed of thin flexible sheet material, said tubes circumferentially arranged and secured together to form passageways opening at the inner and outer peripheries of the ring, opposite walls of said tubes forming portions of the top and bottom walls of the piston ring and the radially disposed side edges of said walls adapted to substantially abut when the ring is fully compressed into positon of use.

VICTOR F. ZAHODIAKIN.